Patented June 15, 1926.

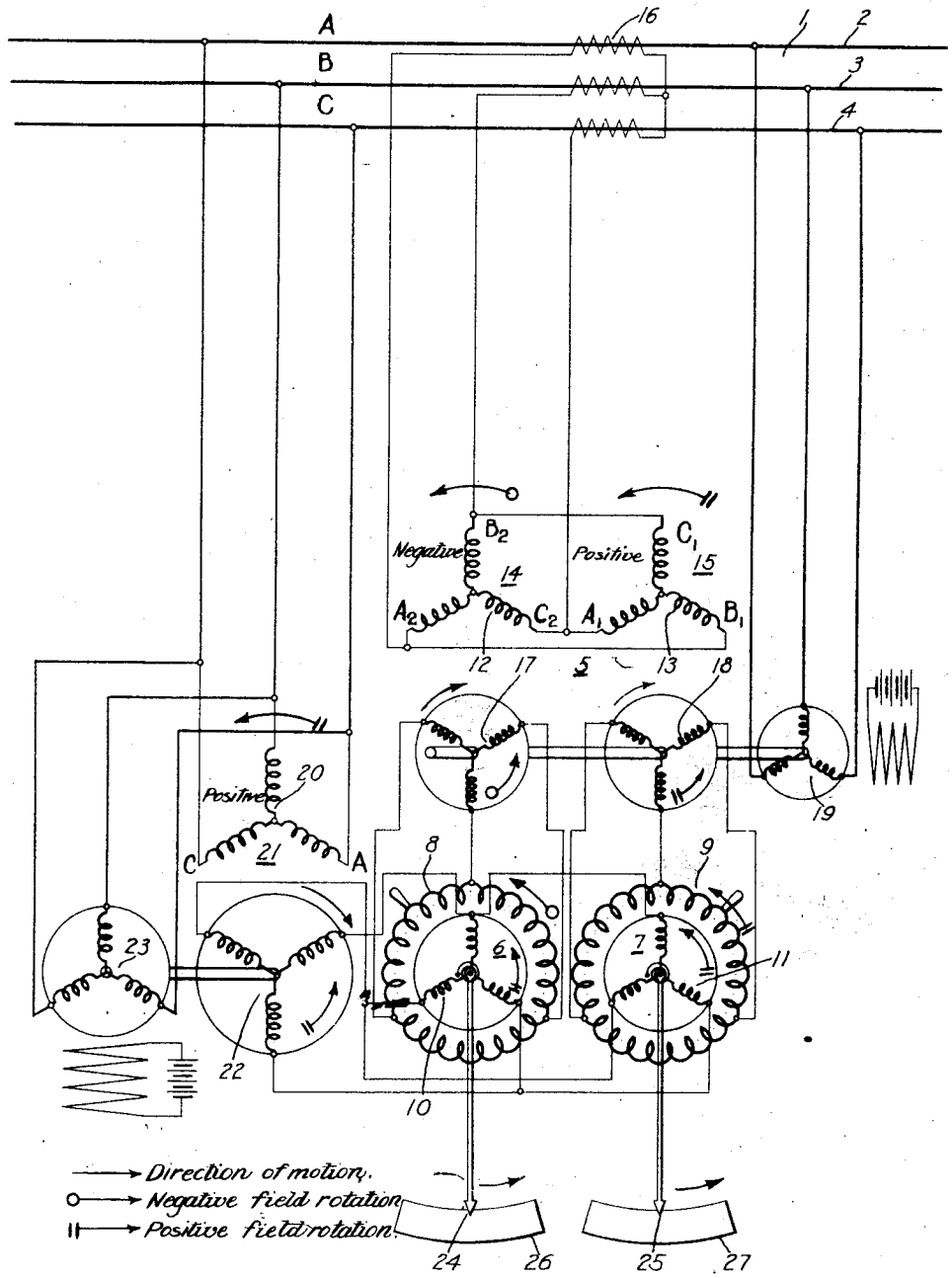

1,588,538

UNITED STATES PATENT OFFICE.

CHARLES LE G. FORTESCUE, OF PITTSBURGH, PENNSYLVANIA, ASSIGNOR TO WESTINGHOUSE ELECTRIC & MANUFACTURING COMPANY, A CORPORATION OF PENNSYLVANIA.

ELECTRICAL MEASURING INSTRUMENT.

Application filed August 30, 1920, Serial No. 406,856. Renewed October 15, 1925.

My invention relates to phase-sequence devices and particularly to means for, and methods of, determining phase-sequence quantities.

One object of my invention is to provide a method of, and means for, determining the phase-sequence volt-amperes, power, power factor and unbalance factor of a polyphase circuit.

A further object of my invention is to provide a device of the above indicated character that shall be simple and inexpensive to construct and effective in its operation.

Letters Patent No. 1,535,593, issued April 28th, 1925, upon the copending application of C. LeG. Fortescue, L. W. Chubb and J. Slepian, sets forth a method of measuring the phase-sequence components of the electrical quantities of polyphase electric circuits.

In that application we disclose a method of measuring the positive and negative phase-sequence components into which an unbalanced three-phase system may be resolved. The method recited consists, briefly, in rotating the rotor of a wound-rotor induction motor at synchronous speed while energizing the stator windings in accordance with the polyphase currents or voltages of the system. By properly energizing the windings of the stator in accordance with the phase sequence of the component to be measured, the value of the predetermined positive or negative phase-sequence component may be measured.

In my present invention, I utilize the principles involved in the above mentioned application but apply the same for the purpose of measuring various quantities other than is contemplated in the above mentioned application.

In practicing my invention, I provide a motor meter having stator and rotor windings normally in definite relative positions, and I impress the positive phase-sequence component of current on the stator windings and the positive phase-sequence component of voltage on the rotor windings. Such positive phase-sequence current and positive phase-sequence voltage are obtained from the circuit by synchronously driven apparatus as outlined above. Under this condition, the rotor will move a distance proportional to the product of the positive phase-sequence current, voltage and the cosine of the angle therebetween, or the positive phase-sequence power. If the stator is moved relatively to the rotor until the rotor indicates a maximum value, the same will correspond to the positive phase-sequence volt-amperes, assuming that the torque is a maximum for the initial position referred to when the currents traversing the stator and rotor windings are in phase. The ratio of these two quantities is, of course, the positive phase-sequence power factor of the circuit.

If the negative phase-sequence component of current is impressed on the stator and the positive phase-sequence component of voltage is impressed on the rotor with the same initially in a definite position with respect to the stator, the meter will indicate a function of the positive phase-sequence voltage and the negative phase-sequence current.

If the stator is again shifted until a maximum indication is obtained, the meter will indicate the volt-amperes or the product of the positive phase-sequence component of voltage and negative phase-sequence component of current. The ratio of this value of volt-amperes to the value of volt-amperes obtained when the positive phase-sequence voltage and positive phase-sequence current are multiplied, is a measure of the current unbalance of the circuit. By impressing various positive and negative phase-sequence components on the different circuits of the motor, various other quantities may be obtained.

The single figure of the accompanying drawings is a diagrammatic view of an electric circuit embodying my invention.

A polyphase electric circuit 1 comprises three conductors 2, 3 and 4 to which a measuring device 5 is operatively connected.

The device 5 comprises, in general, two polyphase motor meters 6 and 7 having stator windings 8 and 9 and rotor windings 10 and 11, respectively. The stator windings 12 and 13 of two induction motors 14 and 15 are connected to the circuit 1, through series transformers 16, in opposite phase sequence.

The rotor windings 17 and 18 of the motors 14 and 15 are driven by a synchronous motor 19 which is operatively connected to the circuit 1. The windings 17 are connected to the stator winding 8 of the meter 6 and the rotor windings 18 are connected to the stator windings 9 of the meter 7. With this arrangement, if the motor 19 is driven synchronously in the direction shown, the winding 8 will be provided with negative phase-sequence current and the winding 9 with positive phase-sequence current, depending upon the connection of the windings 12 and 13 to the transformers 16.

That is, the generation of positive or negative phase-sequence currents in the rotor windings 17 and 18 depends upon the relative direction of rotation of the rotor windings with regard to the order of phase rotation. Thus, if the rotor windings 17 are rotated in the same direction as the phase rotation of the currents traversing the stator windings 12, the rotor windings 17 will not be influenced by the positive phase-sequence component but will have generated therein electromotive forces proportional to the value of the negative phase-sequence current component and double the synchronous frequency. Similarly, the windings 18 will have generated therein electromotive forces proportional to the positive phase-sequence current component.

The primary windings 20 of a motor 21 are connected across the circuit 1, and the secondary windings 22 thereof are driven synchronously by a synchronous motor 23 which is also connected to the circuit. The windings 22 are connected to the rotor windings 10 and 11 of the meters 6 and 7 and, thus, depending upon the direction of rotation of the rotor windings 22, the windings 10 and 11 may be supplied with positive or negative phase-sequence voltage.

The stator windings 8 and 9 of the meters 6 and 7 are relatively movable with respect to the rotor windings 10 and 11 for the purpose of causing the pointers 24 and 25 of the meters 6 and 7 to indicate maximum values in connection with the scales 26 and 27 when the same are desired. Normally, the meters will indicate the product of the electrical forces applied to the stator and the rotor windings and the angle between such forces. If the stator is moved relative to the rotor to eliminate the angle between the forces, a direct product of the forces is then measured.

The stator winding 8 is normally in a definite initial position relative to the rotor winding 10. When polyphase electromotive forces proportional to the negative phase-sequence component of current are impressed upon the stator winding 8 and electromotive forces proportional to the positive phase-sequence component of voltage are impressed upon the rotor windings 10, the pointer 24 will be moved to indicate a value proportional to the product of the voltage and the current components by the angle between them. If the winding 8 is then shifted with respect to the winding 10, until the pointer 24 indicates a maximum value, which it will do when the angle between the current and the voltage component is eliminated, the meter will indicate the volt-amperes or the product of the positive phase-sequence voltage component and negative phase-sequence current component.

The winding 9, similarly, is normally in a definite position with respect to the winding 11 and when subjected to a polyphase electromotive force proportional to the positive phase-sequence current, while the winding 11 is subjected to an electromotive force proportional to the positive phase-sequence voltage, the pointer 25 will indicate the product of the positive phase-sequence current, positive phase-sequence voltage and the co-sine of the angle between them. Now then, if the winding 9 is shifted with respect to the winding 11 until the pointer 25 indicates a maximum value, this value will be proportional to the positive phase-sequence volt-amperes.

In order to better understand the invention, it may be stated that the stationary windings of the instrument 14 are so connected that the direction of the rotation of the negative-sequence field is that indicated by the adjacent arrow, and the stationary windings of the device 15 are so connected that the direction of rotation of the positive-sequence field is that indicated by the adjacent arrow. When the motor 19 is driven in the direction shown by the direction-of-motion arrow, the windings 17 will have negative-sequence currents therein, as indicated by the negative-field-rotation arrow, and the windings 18 will have positive-sequence currents therein, as indicated by the positive-field-rotation arrow. Similarly, the windings 8 will have negative-sequence currents therein, and the windings 9 will have positive-sequence currents therein, as indicated by the adjacent arrows.

The stationary windings of the device 21 are so connected that the direction of rotation of the positive-sequence field is that indicated by the adjacent arrow. When the rotor 22 is driven in the direction shown by the direction-of-motion arrow, positive-sequence currents, in proportion to the positive-sequence voltages impressed upon the stator windings, will flow in the direction shown by the positive-field-rotation arrow. This impresses positive-sequence currents on the windings 10 and positive-sequence currents on the windings 11, as shown by the positive-field-rotation arrows. The pointers 24 and 25 will move in a counter-clockwise direction, the former to indicate the product of a negative-sequence current and a positive-sequence voltage and the co-sine of the angle therebetween, and the latter to indicate the product of the positive-sequence voltage, the positive-sequence current and the co-sine of the angle therebetween.

The stator windings 8 and 9 are adjusted in the one or the other direction, depending upon the unbalancing of the circuit, to cause the pointers 24 and 25 to read maximum values, which, in the case of the pointer 24, will be the product of the negative-sequence current and the positive-sequence voltage, and, in the case of the pointer 25, will be the positive-sequence current and the positive-sequence voltage. The ratio of these two readings is a measure of the unbalancing of the circuit.

The ratio of the positive phase-sequence power to the positive phase-sequence volt-amperes will be the positive phase-sequence power factor. Also, the ratio of the volt-amperes obtained by the product of the negative phase-sequence current and the positive phase-sequence voltage to the positive-phase-sequence volt-amperes will indicate the unbalance factor of current which is the ratio of the negative phase-sequence current component to the positive phase-sequence current component.

The unbalance factor of voltage may be obtained as follows. The rotor windings 22 are rotated in the opposite direction from that indicated and an electromotive force is generated therein that is proportional to the negative phase-sequence component of voltage. When that electromotive force is impressed upon either the windings 10 or 11 and the volt-ampere product obtained, in the manner described above, by shifting the stator, such product may be compared with one of the previous volt-ampere quantities to eliminate the common factor of the current component. The ratio of the negative phase-sequence component to the positive phase-sequence component constitutes the voltage unbalance factor. Thus, by obtaining the various volt-ampere quantities and comparing the different quantities to eliminate the common factor, either the unbalance voltage factor or the unbalance current factor may be ascertained.

My invention is not limited to the specific structures illustrated as it may be variously modified without departing from the spirit and scope of the invention, as set forth in the appended claims.

I claim as my invention:—

1. In an electric circuit, the combination with an induction motor connected to the circuit, and means for synchronously actuating the rotor thereof, of a polyphase motor-meter, the primary winding of which is connected to the rotor winding of the induction motor, and means for impressing a current proportional to the positive phase-sequence voltage in the circuit on the secondary winding of the motor-meter.

2. A sequence-component meter for a polyphase circuit comprising a motor, means for impressing one sequence-component voltage and current only, respectively, on the rotor and on the stator of the motor, and means for shifting the stator with respect to the rotor to cause the rotor to indicate one sequence-component of volt-amperes.

3. In a polyphase electric circuit, the combination with a motor-meter and means for impressing positive phase-sequence current on the stator and positive phase-sequence voltage on the rotor thereof, of means for shifting the stator to obtain a maximum movement of the rotor.

4. A sequence component meter for a polyphase circuit comprising a motor, means for impressing positive phase-sequence component voltage and current only, respectively, on the rotor and stator of the motor, and means for shifting the stator with respect to the rotor to cause the rotor to indicate the positive phase-sequence volt-amperes.

5. A sequence component meter for a polyphase circuit comprising a motor, means for impressing the same phase-sequence component voltage and current only on the rotor and stator, respectively, of the motor, and means for shifting the stator with respect to the rotor to cause the rotor to assume a position which is a meausre of one phase-sequence component of the volt amperes traversing the circuit.

6. A sequence-component meter for a polyphase circuit comprising two relatively movable, inductively-related windings, means for impressing a current proportional to a symmetrical component of the voltages in said circuit on one of said windings and means for impressing a current proportional to a symmetrical component of the currents in said circuit on the other of said windings.

7. In combination, a polyphase circuit, means for segregating the positive and negative phase-sequence components, respectively, of the currents and a phase-sequence component of the voltages in said circuit and a volt-ampere meter actuated in accordance with the product of two of said components.

8. In combination, a polyphase circuit, means for segregating one phase-sequence component of the currents and of the voltages in said circuit and an electroresponsive device having distributing windings connected to said segregating means, said windings being relatively movable.

9. In combination, a polyphase circuit, means for segregating one phase-sequence component of the currents and of the voltages in said circuit and means whereby an indication is obtained of the value of the product of said current component and said voltage component.

In testimony whereof, I have hereunto subscribed my name this 30th day of July 1920.

CHARLES LE G. FORTESCUE.